United States Patent [19]
McGovern

[11] Patent Number: 5,983,452
[45] Date of Patent: Nov. 16, 1999

[54] WHEEL SKID

[76] Inventor: Terence R. McGovern, 1107 Paumanack Village Dr., Greenlawn, N.Y. 11740

[21] Appl. No.: 09/008,399

[22] Filed: Jan. 17, 1998

[51] Int. Cl.⁶ .................................................. B60B 33/00
[52] U.S. Cl. ......................... 16/42 R; 16/18 B; 16/42 T; 280/160; 280/160.1; 280/157
[58] Field of Search .................................. 16/18 B, 42 R, 16/42 T, 346.11; 280/160, 160.1, 157

[56] References Cited

U.S. PATENT DOCUMENTS

| | | | |
|---|---|---|---|
| 1,012,404 | 12/1911 | Means | ............................................ 16/18 |
| 3,858,271 | 1/1975 | Howard et al. | .......................... 16/42 R |

*Primary Examiner*—Anthony Knight
*Assistant Examiner*—Agatha Youmans
*Attorney, Agent, or Firm*—Harvey Lunenfeld

[57] ABSTRACT

A wheel skid having an arcuate base for facilitating mobility of a vehicle on terrain where wheels ordinarily sink into the terrain, and/or otherwise become directed in a direction other than the desired direction of travel of such vehicles, and where wheeled transportation is otherwise difficult or impossible, and hazardous. The wheel skid has an arcuate base having a slot, a wheel assembly having a wheel, the slot having the wheel of the wheel assembly protruding therethrough, and a fastener fastening the wheel assembly thereto the wheel skid. The wheel skid may be supplied as a complete unit and/or as an accessory skid for retrofit installations.

45 Claims, 18 Drawing Sheets

WHEEL SKID

BACKGROUND OF THE INVENTION

1. Field of the Invention

The present invention relates generally to wheels and more particularly to all terrain wheels and skids.

2. Background Art

Wheel chairs which are generally propelled by an occupant, and which may be pushed from behind, and other manually propelled vehicles and the like, such as strollers, shopping carts, and wheel barrows are often used on pavement, man made floors, and the like. Such pavement, man made floors, and the like are often constructed to facilitate wheeled transportation.

Once an attempt is made to propel and manipulate such vehicles on terrain where the vehicle's wheels sink into the terrain and/or on terrain other than that specifically designed and constructed for wheeled transportation, propulsion, manipulation, and maneuvering on such terrain becomes extremely difficult and hazardous, the wheels often becoming directed in a direction other than the desired direction of movement of such vehicles. Propulsion, manipulation, and maneuvering of a wheel chair by an occupant on such terrain as sand, snow, ice, and mud often becomes extremely difficult, and often virtually impossible requiring extreme strength and physical dexterity to propel the wheel chair, manipulate, maneuver, and prevent the wheel chair from tipping over. Such physical strength and manipulative ability may also be required to push and maneuver a stroller, shopping cart, wheel barrow and the like over sand, snow, ice, and mud and may be hazardous to an occupant, such as a small child, or items in such vehicles, and hazardous to the individual propelling such vehicle.

Snow and ice conditions, mud and sand, in particular, are often unavoidable in daily life situations for a disabled person having a wheel chair as his or her sole source of mobility and transportation, and to a parent or individual responsible for pushing a child in a stroller. Each of these situations is difficult and hazardous to the person propelling, manipulating, and maneuvering the vehicle, but likewise to the occupant, if they are not one in the same, and often to other individuals in the vicinity. The individual propelling and guiding such vehicle may not and often does not have the physical prowess, manipulative ability, and physical dexterity to successfully negotiate such vehicle safely, if at all, under such adverse conditions. Similar problems exist for users of shopping carts, wheel barrows, and the like, and motorized and engine driven vehicles, as well.

There is a need for a simple, easy to use, easy to install and remove, portable, light weight, low cost, safe, attractive, and durable device to facilitate mobility, propulsion, manipulation, and maneuvering of manually propelled vehicles and the like, such as wheel chairs, strollers, shopping carts, and wheel barrows, as well as motorized and engine driven vehicles on difficult terrain. Such a device should improve handling and personal safety for an individual propelling such vehicles, occupants of such vehicles, and individuals in the vicinity of such vehicles. The device should be capable of use on snow, sand, ice, mud and other terrain, and the like, where wheels ordinarily sink into the terrain, and/or otherwise become directed in a direction other than the desired direction of travel of such vehicles, and make wheeled transportation otherwise difficult or impossible, and hazardous, and be easy to use. The device should be of simple construction, easy to manufacture, and easily installable as a retrofit on existing vehicles or in new installations during construction and fabrication of such vehicles, adjustable and installable for different wheel sizes and on different types of vehicles.

Different wheels and skis have heretofore been known. However, none of the wheels and skis adequately satisfies these aforementioned needs.

Different wheel chair devices have been disclosed for use on difficult terrain.

U.S. Pat. No. 5,457,837 (Zuckerbrod) discloses a portable track device for a wheel chair for travel across difficult terrain, such as a sandy beach, which includes at least two track sections which can be coupled removably to each other. Each track section has a bottom channel between a right side wall and a left side wall, with a reinforcement rod in each side wall and with transverse supports located in a bottom channel. Each track section is equal to, or greater than, the length of the wheelchair.

U.S. Pat. No. 5,261,470 (Genaw et al) discloses a snow chain kit for drive wheels of a wheel chair having a number of pairs of attachment strips for each wheel and a traction strap for each pair of strips, each of the straps having a plurality of chains for providing traction on ice or snow and each pair of strips being mounted on opposite sides of the wheels, with the straps wrapped around a tire and being attached to one pair of strips.

U.S. Pat. No. 5,116,067 (Johnson) discloses a wheel chair having a support structure that can be adapted to attach standard wheel chair wheels for providing mobility and allowing interchangeability of accessories to change the support structure for sporting events, such as water and snow skiing. The wheel chair has a frame and sockets to replace attachable wheels with water and snow skis.

U.S. Pat. No. 4,141,566 (Banes et al) discloses a sled frame for releasable attachment of a wheel chair. The sled frame has a body portion supporting a pair of laterally spaced, horizontally disposed support members which, in turn, are sized to be disposed between the wheels of a wheel chair to support the frame of the wheel chair on the sled. The support members are each provided with a plurality of locking devices which releasably engage the frame of the wheel chair to securely lock the wheel chair to the sled.

French Patent No. FR 2655273 (Massarotti and Roux) discloses a wheel chair held on a pair of skis having raised tips at each end of the skis and U shaped fixtures to hold the wheel chair's wheels.

U.S. Pat. No. 5,076,390 (Haskins) discloses a wheel chair having a foldable frame with an interlinked system of parallelogram linkages which can be readily collapsed for travel and to provide access to otherwise restricted areas.

U.S. Pat. No. 5,253,825 (Christian) discloses an aircraft ski for attachment to an axle of a ground wheel of an aircraft having a pair of rams to move the ski upward and downward from a retracted position to a deployed position.

For the foregoing reasons, there is a need for a simple, easy to use, easy to install and remove, portable, light weight, low cost, safe, attractive, and durable device to facilitate mobility, propulsion, manipulation, and maneuvering of manually propelled vehicles and the like, such as wheel chairs, strollers, shopping carts, and wheel barrows, as well as motorized and engine driven vehicles on difficult terrain. Such a device should improve handling and personal safety for an individual propelling such vehicles, occupants of such vehicles, and individuals in the vicinity of such vehicles.

The device should be capable of use on snow, sand, ice, mud and other terrain, and the like, where wheels ordinarily sink into the terrain, and/or otherwise become directed in a direction other than the desired direction of travel of such vehicles, and make wheeled transportation otherwise difficult or impossible, and hazardous, and be easy to use. The device should be of simple construction, easy to manufacture, and easily installable as a retrofit on existing vehicles or in new installations during construction and fabrication of such vehicles, adjustable and installable for different wheel sizes and on different types of vehicles.

SUMMARY

The present invention is directed to a simple, easy to use, easy to install and remove, portable, light weight, low cost, safe, attractive, and durable wheel skid. The wheel skid facilitates mobility, propulsion, manipulation, and maneuvering of manually propelled vehicles and the like, such as wheel chairs, strollers, shopping carts, and wheel barrows, as well as motorized and engine driven vehicles, and improves handling and personal safety for an individual propelling such vehicles, occupants of such vehicles, and individuals in the vicinity of such vehicles. The wheel skid is capable of use on snow, sand, ice, mud and other terrain, and the like, where wheels ordinarily sink into the terrain, and/or otherwise become directed in a direction other than the desired direction of travel of such vehicles, and make wheeled transportation otherwise difficult or impossible, and hazardous, and be easy to use. The wheel skid is of simple construction, easy to manufacture, and easily installable as a retrofit on existing vehicles or in new installations during construction and fabrication of such vehicles, adjustable and installable for different wheel sizes and on different types of vehicles. The wheel skid may be supplied as a complete unit and/or as an accessory skid for retrofit installations. The wheel skid facilitates mobility of a vehicle on terrain where wheels ordinarily sink into the terrain and where wheeled transportation is otherwise difficult or impossible, and hazardous.

A wheel skid having features of the present invention comprises: an arcuate base having a slot, a wheel assembly having a wheel, the slot having the wheel of the wheel assembly protruding therethrough, and a fastener fastening the wheel assembly thereto the wheel skid.

A skid having features of the present invention comprises: an arcuate base having a slot, a fastener for fastening a wheel assembly having a wheel thereto, the wheel of the wheel assembly protruding therethrough the slot.

DRAWINGS

These and other features, aspects, and advantages of the present invention will become better understood with regard to the following description, appended claims, and accompanying drawings where:

FIG. 8 is a side view of the skid and the wheel of FIG. 6 shown entering terrain to be travelled and maneuvered over and through;

DESCRIPTION

Figure 1:
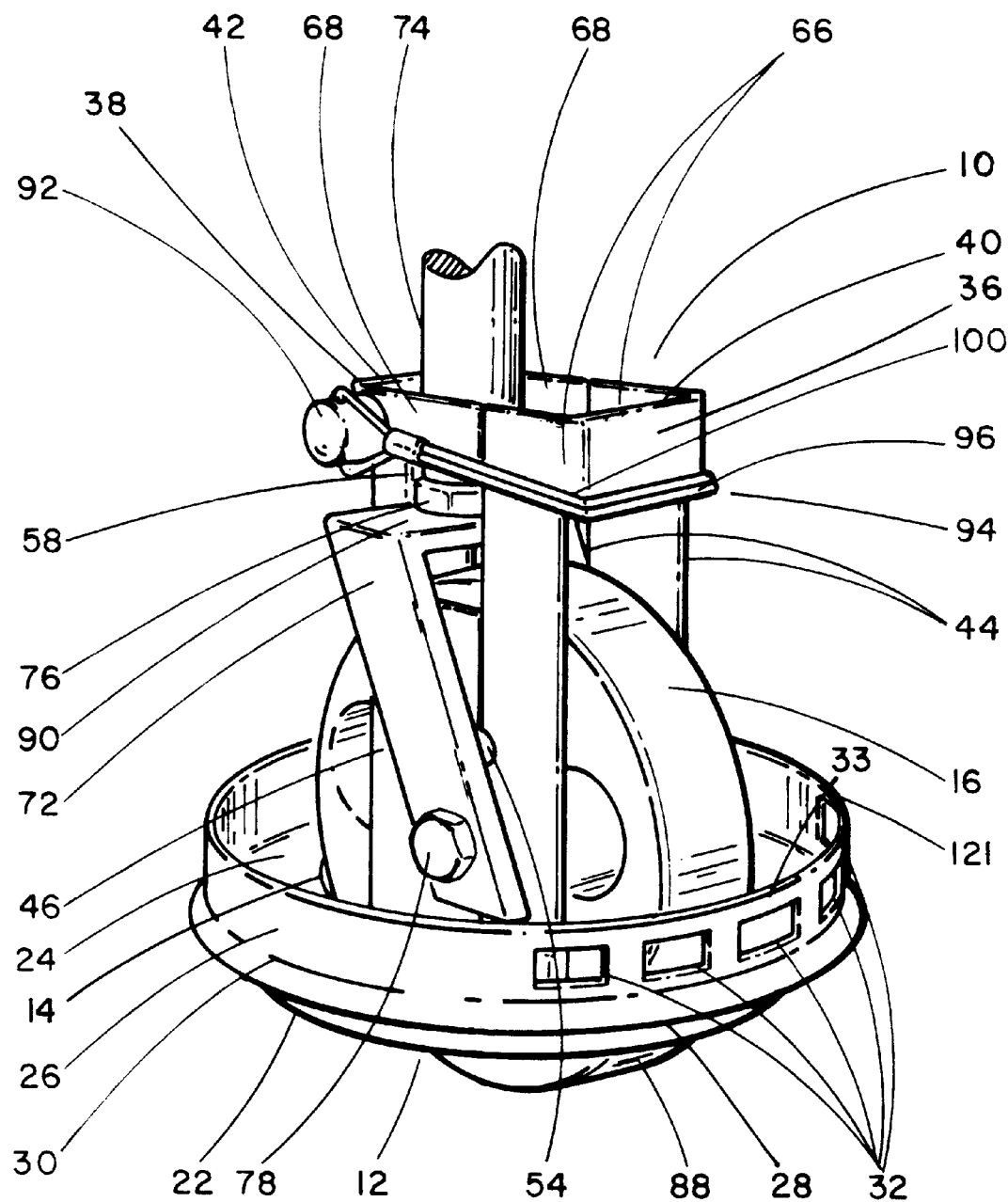
FIG. 1 is a perspective view of a wheel skid constructed in accordance with the present invention.

The preferred embodiments of the present invention will be described with reference to FIGS. 1–13 of the drawings. Identical elements in the various figures are identified with the same reference numbers.

FIGS. 1–8 shows an embodiment of a wheel skid 10, constructed in accordance with the present invention. The wheel skid 10 has arcuate base 12 having slot 14, wheel 16 of wheel assembly 18 protruding therethrough, and fastener 20 having the wheel assembly 18 affixed thereto.

The arcuate base 12 is saucer shaped having convex surface 22 facing terrain to be travelled and maneuvered over and through and concave surface 24 facing away from the terrain to be travelled and maneuvered over and through. The saucer shaped arcuate base 12 is circular and has rim 26 having circumference 28 adjoined to edge 30 of the arcuate base 12. The rim 26 has trailing holes 32 at rear 33 of the rim 26. The slot 14 is substantially centrally located in the arcuate base 12. The concave surface 24 of the arcuate base 12 has upturned trailing lip 34 at rear 35 of the slot 14 directed toward the wheel 16.

The fastener 20 has fixed cutout U shaped channel 36 and matingly hinged cutout U shaped channel 38 having U shaped top portions 40 and 42, respectively, adjoined to side members 44 and 46, respectively. The side members 44 of the fixed cutout U shaped channel 36 are adjoined to the concave surface 24 of the arcuate base 12 at bases 48 of the sides members 44 and straddle the slot 14. Channel base extension members 50 are adjoined to the bases 48 of the side members 44. The side members 46 of the matingly hinged cutout U shaped channel 38 are hinged to the channel base extension members 50 at hinge pins 52.

The side members 44 and 46 of the fixed cutout U shaped channel 36 and the matingly hinged cutout U shaped channel 38 have mating semicircular holes 54 and 56, respectively, and the side members 46 of the matingly hinged cutout U shaped channel 38 have rectangular notch portions 58.

Tab extensions 62 having holes 64 are adjoined to sides 66 of the U shaped top portion 40 of the fixed cutout U shaped channel 36. Sides 68 of the U shaped top portions 42 of the matingly hinged cutout U shaped channel 38 have matingly aligned holes 70 aligned with the holes 64 of the tab extensions 62 upon closure of the matingly hinged cutout U shaped channel 38 abuttingly against the fixed cutout U shaped channel 36.

The wheel assembly 18 has swivel mounted oblique angled fork 72 angularly offset with respect to shaft 74 and roller bearings (not shown) within compound joint 76 to facilitate free rotational motion. The wheel 16 is mounted on the swivel mounted oblique angled fork 72 at axle 76 having end nuts 78. The wheel skid 10 is suitable for use with a variety of vehicles. Typical vehicles that the wheel skid 10 may be used with are a wheel chair 80, stroller 82, shopping cart 84, and wheel barrow 86 shown in FIGS. 9–12 and other suitable vehicles. The shaft 74 is affixed to a vehicle, such as the wheel chair 80 or other vehicle, by inserting the shaft 74 into a suitable receiving fixture 82 on the vehicle or the wheel chair 80.

The wheel assembly 18 is inserted therebetween the fixed cutout U shaped channel 36 and the matingly hinged cutout U shaped channel 38 when the matingly hinged cutout U shaped channel 38 is hingedly opened from the fixed cutout U shaped channel 36. After insertion of the wheel assembly 18 therebetween the opened matingly hinged cutout U shaped channel 38 and the fixed cutout U shaped channel 36, the matingly hinged cutout U shaped channel 38 is abuttingly closed and locked against the fixed cutout U shaped channel 36 with the axle 76 locked therebetween a selected set of the mating semicircular holes 54 and 56, allowing wheel portion 88 to extend from the convex surface 22 of the arcuate base 12, top 90 of the oblique angled fork 72 locked therebetween the rectangular notch portions 58 and the side member 44 of the fixed cutout U shaped channel, and the shaft 74 extending therebetween the U shaped top portions 40 and 42, respectively. The appropriate semicircular holes 54 and 56 for insertion of the axle 76 therebetween are selected to allow the wheel portion 88 to extend from the convex surface 22 of the arcuate base 12 and is based upon diameter 89 of the wheel 16, and to allow for use of the wheel skid 10 with different diameter wheels.

The wheel skid 10 has hitch pin 92 having hinged U shaped spring clip 94. Upon closure of and abutting the matingly hinged cutout U shaped channel 38 against the fixed cutout U shaped channel 36, the matingly hinged cutout U shaped channel 38 is locked against the fixed cutout U shaped channel 36 with the hitch pin 92. The hitch pin 92 is inserted therethrough the matingly aligned holes 70 of the matingly hinged cutout U shaped channel 38 and the aligned holes 64 of the tab extensions 62. Base 96 of the hinged U shaped spring clip 94 is tensionally fastened abuttingly against corner edge 98 at the U shaped top portion 40 and the side members 44 of the fixed cutout U shaped channel 36 beneath overhanging lip 99 of the U shaped top portion 40 with legs 100 and 102 of the hinged U shaped spring clip 94 tensionally straddled abuttingly against the sides 66 of the U shaped top portion 40, and the leg 102 having latch hole 103, locking the matingly hinged cutout U shaped channel 38 abuttingly against the fixed cutout U shaped channel 36, the latch hole 103 latching and locking the U shaped spring clip 94 to the hitch pin 92, and locking the wheel assembly 18 thereinto place.

The U shaped spring clip 94 may be reversably removed from the hitch pin 92 by releasably removing the latch hole 103 from the hitch pin 92. The hinged U shaped spring clip 94 may then be tensionally unstraddled from the matingly hinged cutout U shaped channel 38 and the fixed cutout U shaped channel 36. The hitch pin 92 may be reversably removed from the matingly aligned holes 70 of the matingly hinged cutout U shaped channel 38 and the aligned holes 64 of the tab extensions 62. The wheel assembly 18 may be reversably removed from the wheel skid 10 by hingedly opening the matingly hinged cutout U shaped channel 38 from the fixed cutout U shaped channel 36 and removing the wheel assembly 18 therefrom.

The hitch pin 92 may alternatively have an optional resilient rubber or bungee strap (not shown) in place of the hinged U shaped spring clip 94 for abuttingly locking the matingly hinged cutout U shaped channel 38 against the fixed cutout U shaped channel 36.

The wheel skid 10 may be used to travel and maneuver over and through a variety of terrain. For wheel supported terrain 104, such as man made floors and roads of concrete, wood, asphalt and other like materials generally constructed for wheeled transportation and other hard floors and roads, the wheel 16 rolls over the wheel supported terrain 104 with the arcuate base 12 elevated above the wheel supported terrain 104. For wheel sinkable terrain 106, which a wheel would ordinarily sink into, such as sand, snow, ice, mud, and other like terrain, the wheel 16 sinks into such wheel sinkable terrain 106 with the wheel 16 partially or fully submerged and the convex surface 22 of the arcuate base 12 contacts and slides over and through the wheel sinkable terrain 106. The broader surface area of the convex surface 22 of the arcuate base 12 compared with the narrower and smaller surface area of the wheel 16 allows the arcuate base 12 to slide over and through the wheel sinkable terrain 106, while the wheel is partially or fully submerged in the wheel sinkable terrain 106. Sloping leading arcuate portion 108 of the convex surface 22 of the arcuate base 12 provides mechanical advantage to aid in lifting and moving the wheel skid 10 forward. Depth 110, diameter 112, and curvature 114 of the arcuate base 12 determine the mechanical advantage and may be varied depending terrain and other requirements. The saucer shaped arcuate base 12 may optionally be bowl shaped, depending upon terrain requirements.

The saucer shaped circular arcuate base 12 is symmetrical and allows the wheel skid 10 to slide over different terrain in substantially the same manner independent of the direction that the wheel 16 is facing, although some additional drag may be present when front 116 or rear 118 of the wheel skid 10 is other than substantially aligned with direction of travel 120.

In those cases in which the wheel 16 is allowed to swivel, such as in a swivel wheel or caster, the symmetrical saucer shaped circular arcuate base 12 allows the wheel skid 10 to self correct to the direction of least drag, such that the front 116 or the rear 118 of the wheel skid 10 corrects to substantially the direction of travel 120. The swivel mounted oblique angled fork 72, which is angularly offset with respect to the shaft 74 and having free rotational motion allows the wheel skid 10 to further self correct to the forward direction of travel 98, such that the front 116 of the wheel skid 10 faces and travels in the forward direction of travel 120.

The rim 26 of the arcuate base 12 minimizes collection of particles and debris at the concave surface 24 of the arcuate base 12. The trailing holes 32 at the rear 33 of the rim 26 allows particles and debris that may be collected at the concave surface 24 of the arcuate base 12 to be released from the concave surface 24 to an area exterior to the wheel skid 10. The upturned trailing lip 34 at the rear 35 of the slot 14 in the concave surface 24 of the arcuate base 12 directed toward the wheel 16 minimizes collection of particles and debris at the concave surface 24 of the arcuate base 12. The rim 26 may have optional rounded edge 121, as a safety feature for minimizing injury to a person or animal who might inadvertently step on or come in contact with the rim 26. An optional flotation collar (not shown) may be affixed to the rim 26 to enhance buoyancy and floatation characteristics for use in water laden terrain and swamps.

The wheel skid 10 may be of metal, such as steel, or aluminum, thermoplastics, thermosetting polymers, rubber, or other suitable material or combination thereof. The wheel skid 10 may be easily installed and removed from a variety of new and existing vehicles and as a retrofit to such vehicles and may be supplied as an accessory for retrofit installations or as the wheel skid 10. Skid 122 shown in FIG. 2 of the wheel skid 10 may be optionally used for retrofits.

Figure 13:
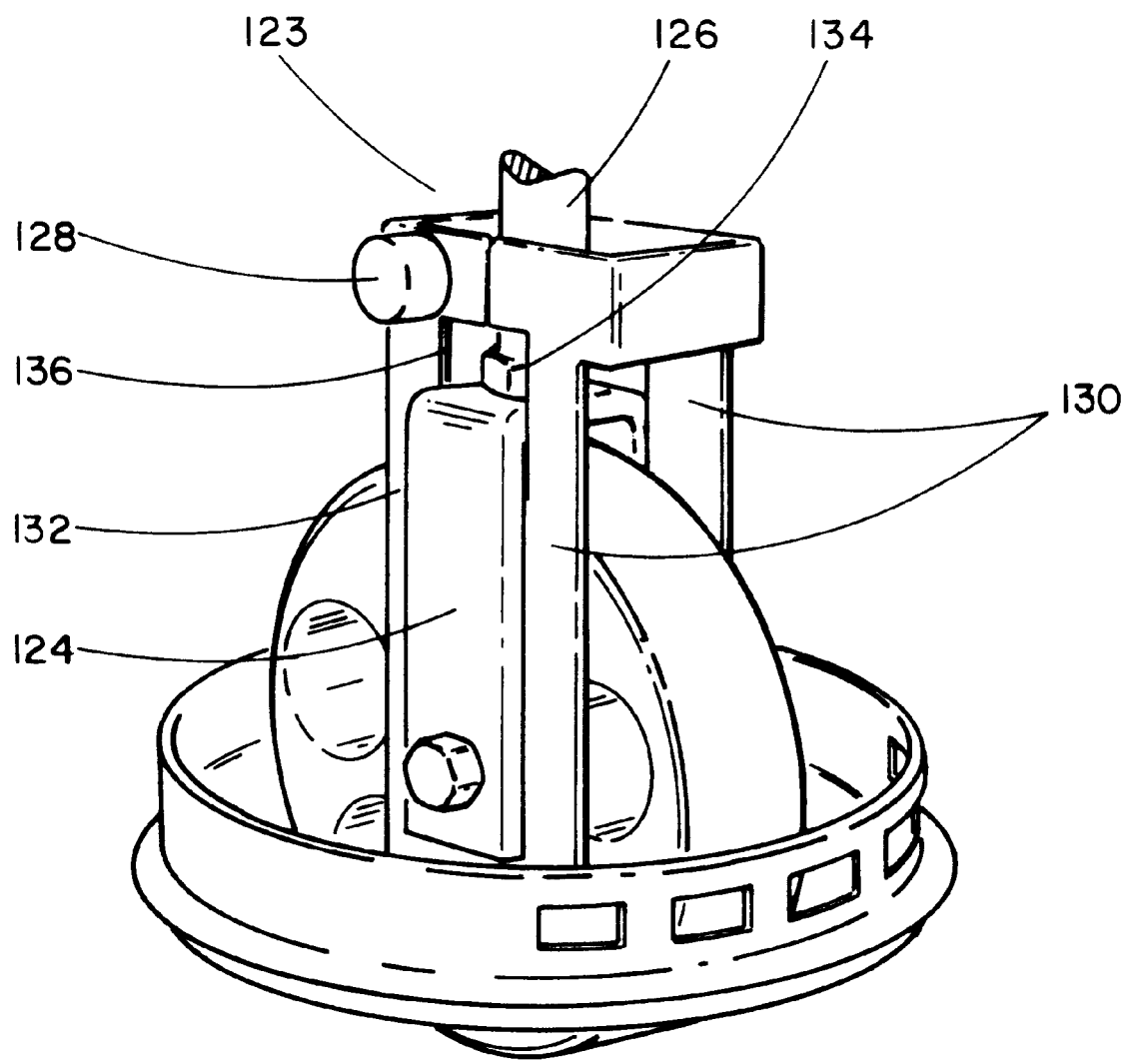
FIG. 13 is a perspective view of an alternate embodiment of a wheel skid constructed in accordance with the present invention.

An alternate embodiment of a wheel skid 123 shown in FIG. 13 is substantially the same as the wheel skid 10 of FIG. 1, except that the wheel skid 123 has a swivel mounted fork 124 collinear with shaft 126, locking pin 128, and side members 130 and 132 having notch portions 134 and 136, respectively.

Figure 14:
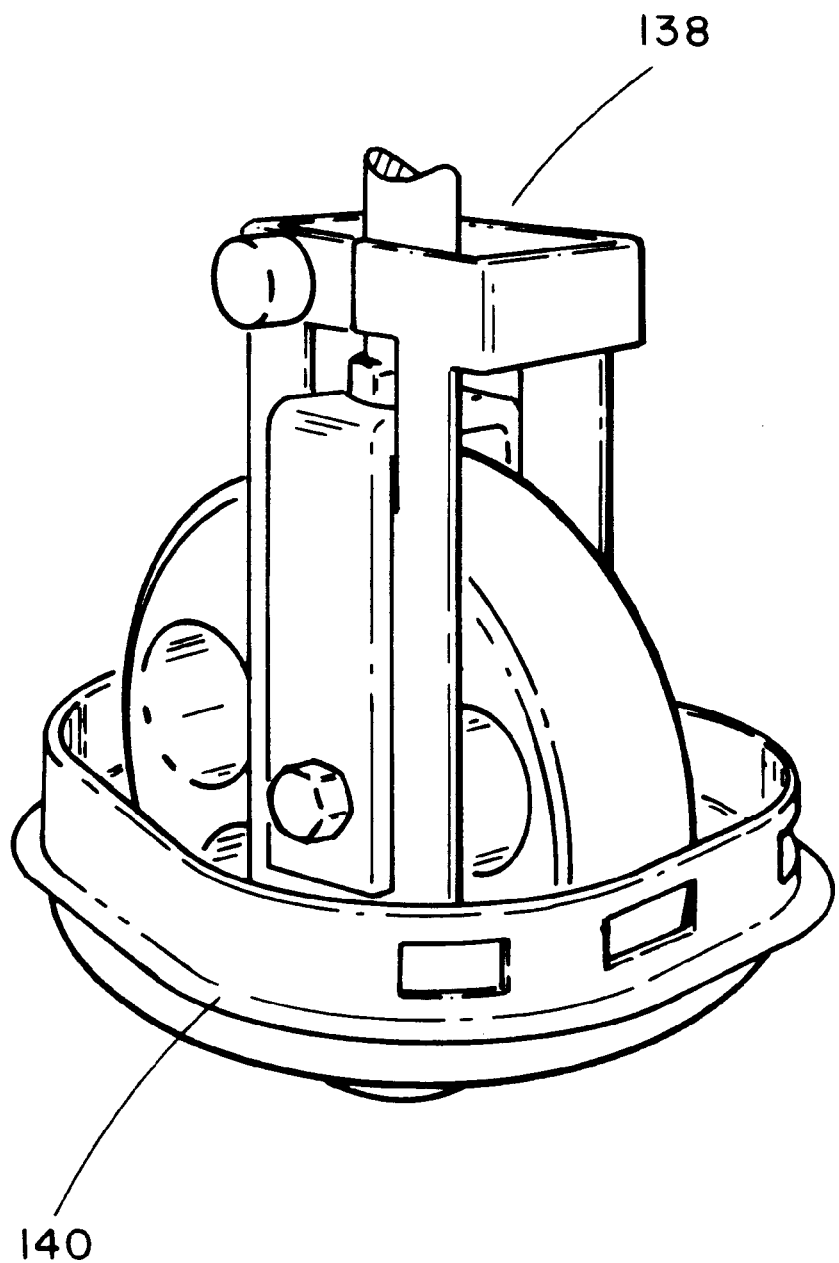
FIG. 14 is a perspective view of an alternate embodiment of a wheel skid constructed in accordance with the present invention.

An alternate embodiment of a wheel skid 138 shown in FIG. 14 is substantially the same as the wheel skid 123 of FIG. 13, except that the wheel skid 138 has a substantially triangular shaped arcuate base 140.

Figure 15:
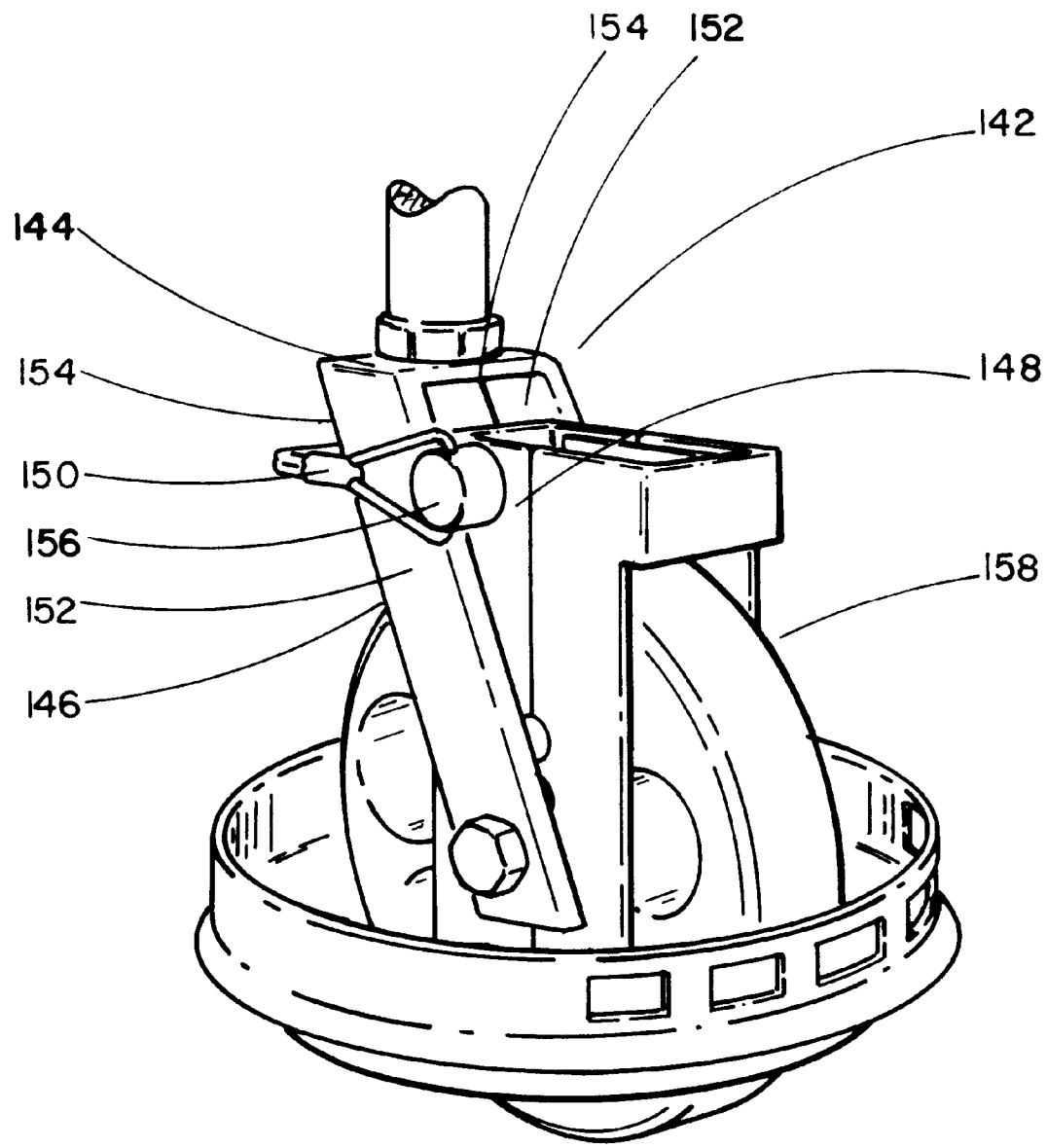
FIG. 15 is a perspective view of an alternate embodiment of a wheel skid constructed in accordance with the present invention.

An alternate embodiment of a wheel skid 142 shown in FIG. 15 is substantially the same as the wheel skid 10 of FIGS. 1–8, except that the wheel skid 142 has top 144 of swivel mounted oblique angled fork 146 exterior to and straddling hinged cutout U shaped channel 148. Hinged U shaped spring clip 150 straddles sides 152 and back 154 of the swivel mounted oblique angled fork 146 and locks the swivel mounted oblique angled fork 146 abuttingly against hitch pin 156.

The rectangular notch portions 58 of the wheel skid 10 are optional in the wheel skid 142, as the top 144 of the swivel mounted oblique angled fork 146 is exterior to the hinged cutout U shaped channel 148. The skid 122 shown in FIG. 2 of the wheel skid 10 may be optionally used with a wheel assembly having an oblique angled fork which is longer than the length of the fixed cutout U shaped channel 36 and the matingly hinged cutout U shaped channel 38 to construct the wheel skid 142. The wheel skid 142 has the top 144 of the swivel mounted oblique angled fork 146 of wheel assembly 158 exterior to and straddling the hinged cutout U shaped channel 148.

Figure 2:
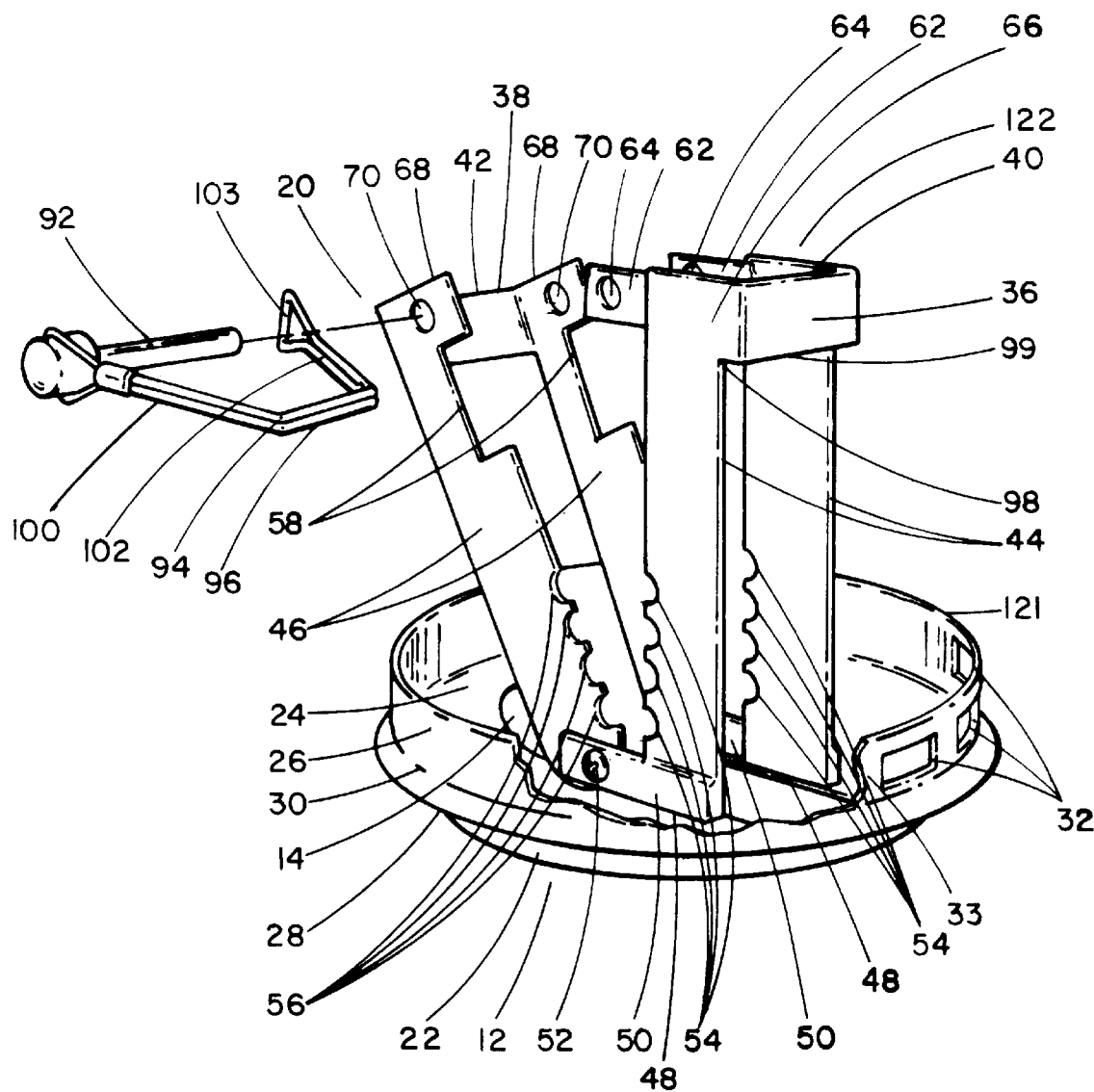
FIG. 2 is a perspective view of a skid constructed in accordance with the present invention.
Figure 3:
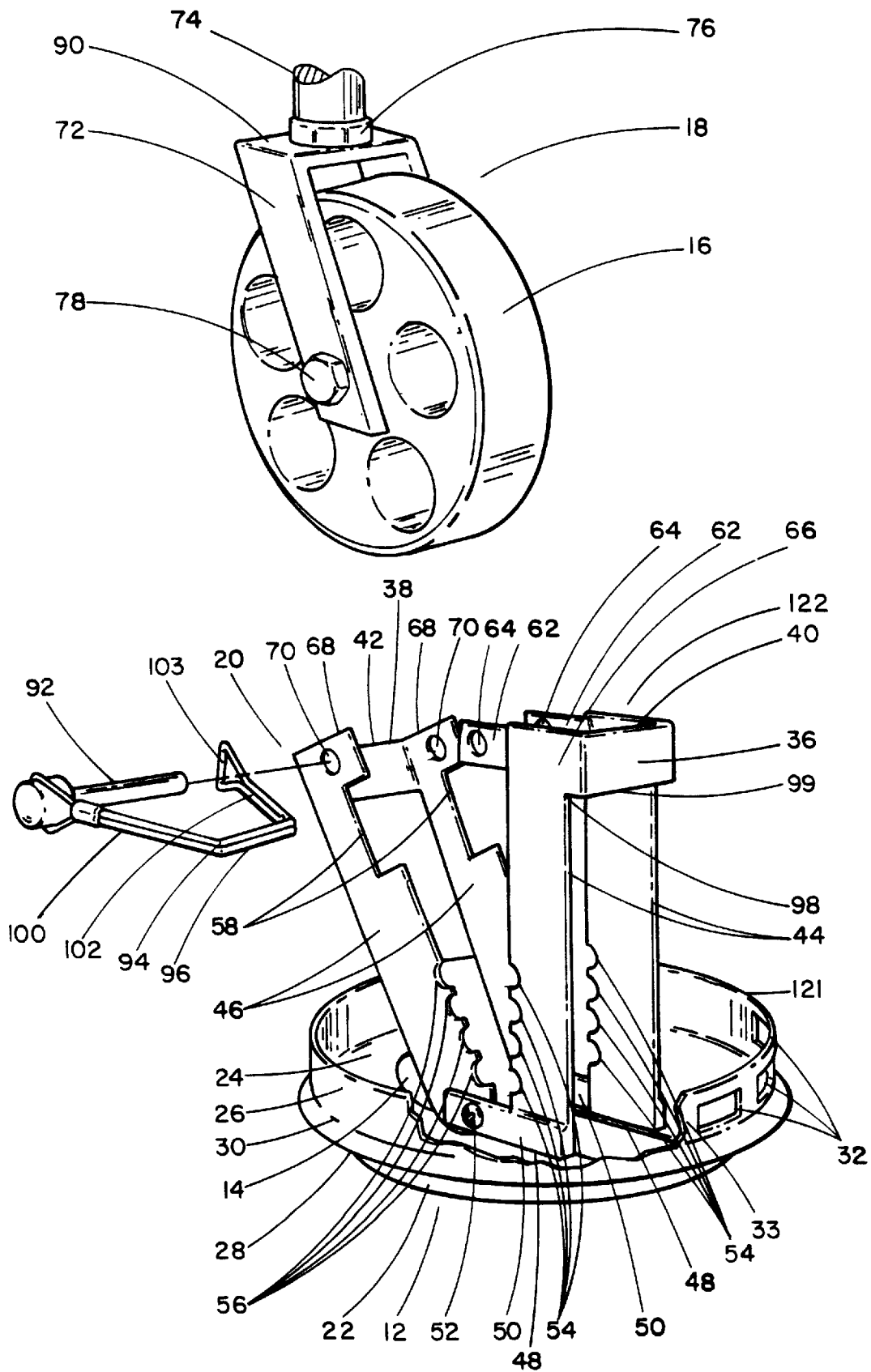
FIG. 3 is a perspective break out view of the wheel skid prior to assembly of the skid and a wheel assembly.
Figure 4:
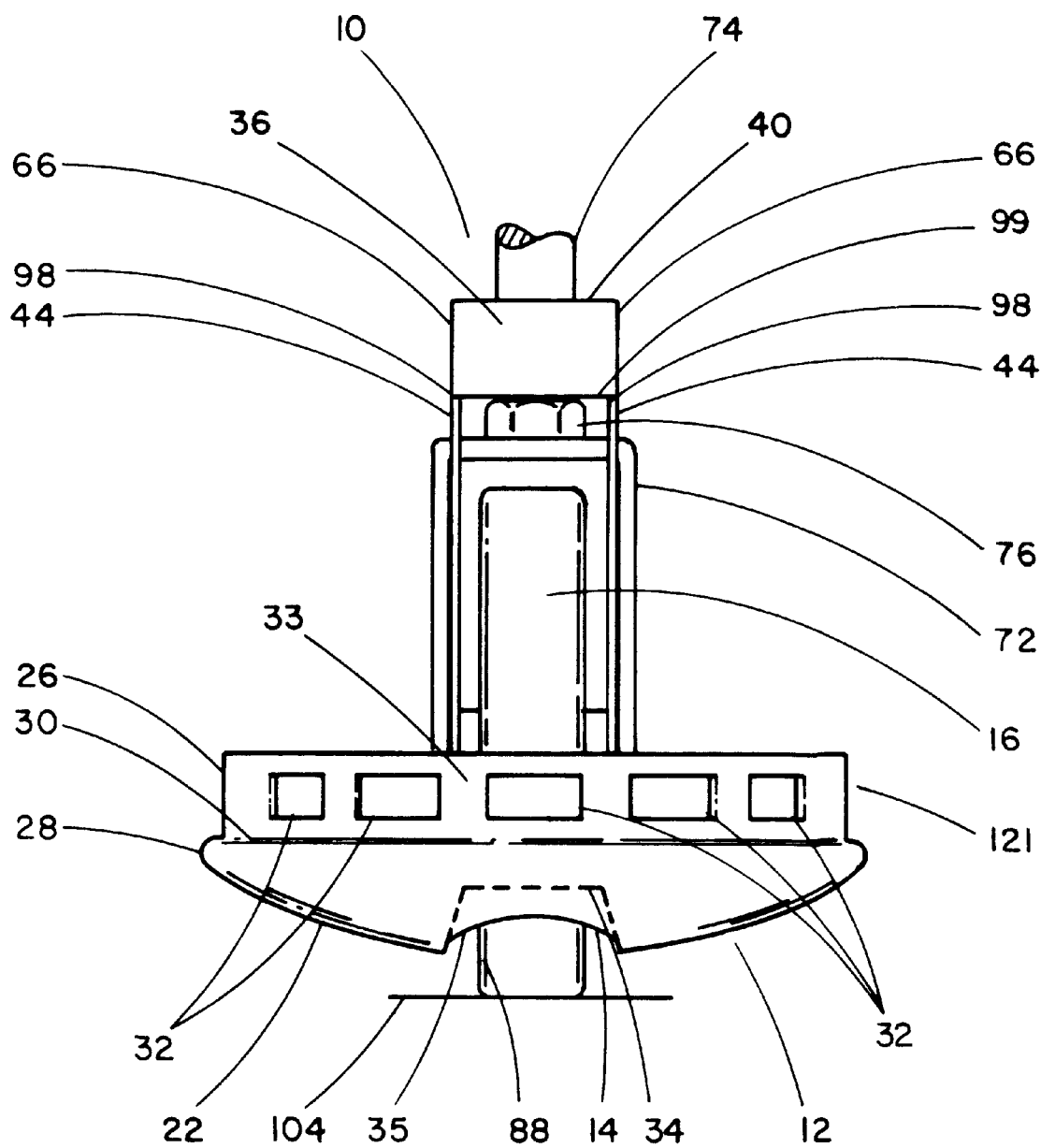
FIG. 4 is a rear view of the wheel skid.
Figure 5:
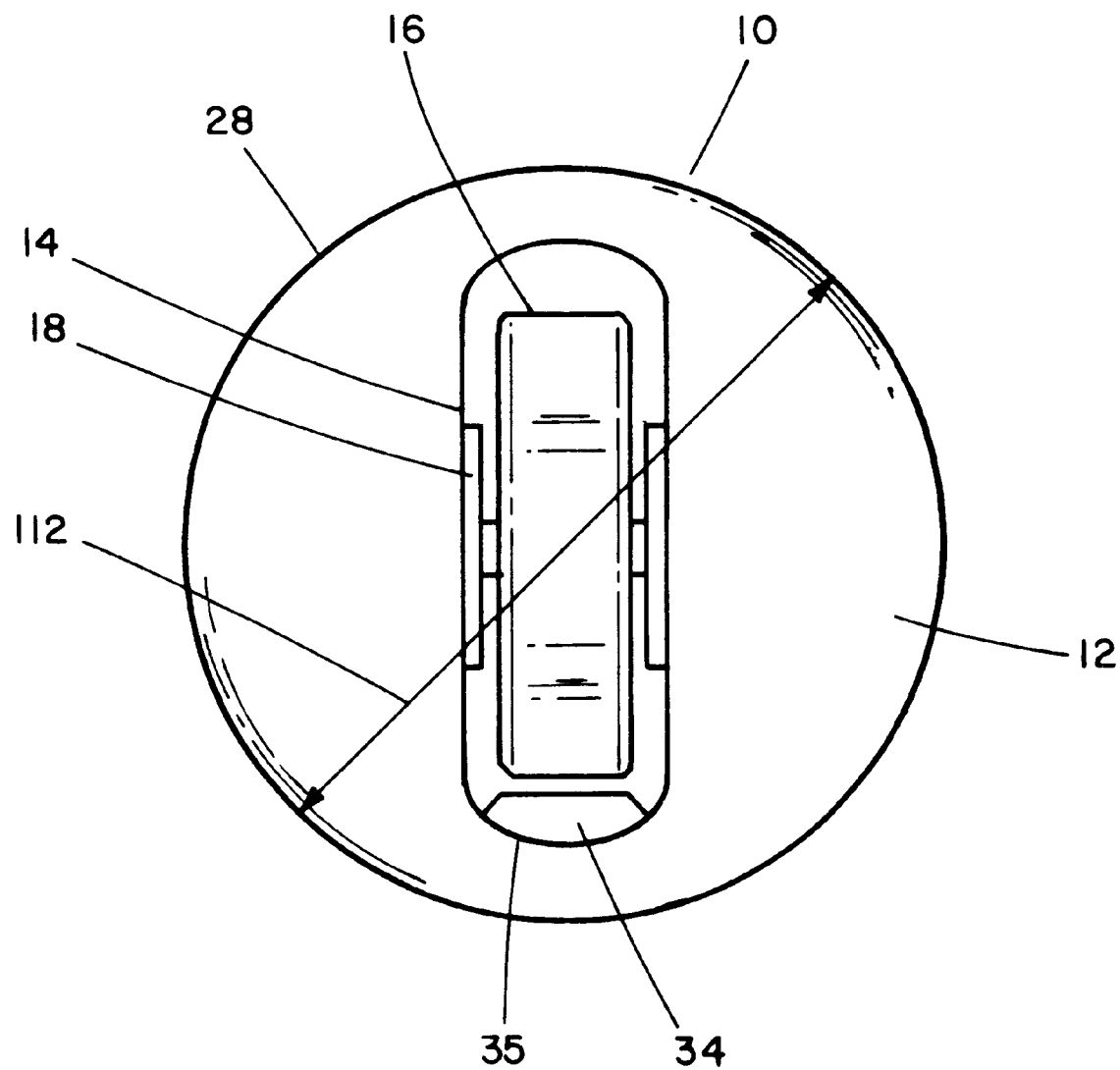
FIG. 5 is a bottom view of the wheel skid.
Figure 6:
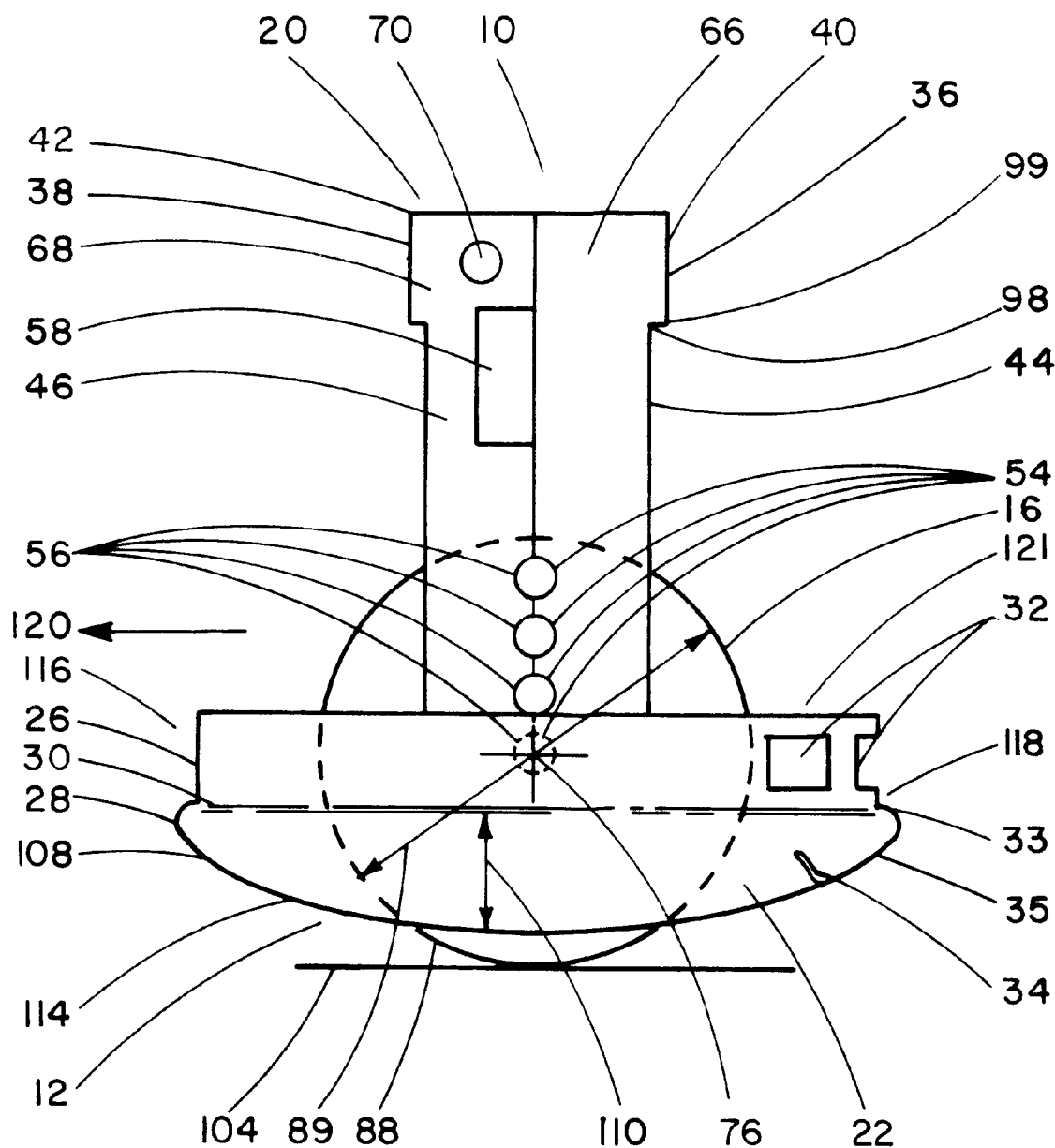
FIG. 6 is a side view of the skid and a wheel.
Figure 7:
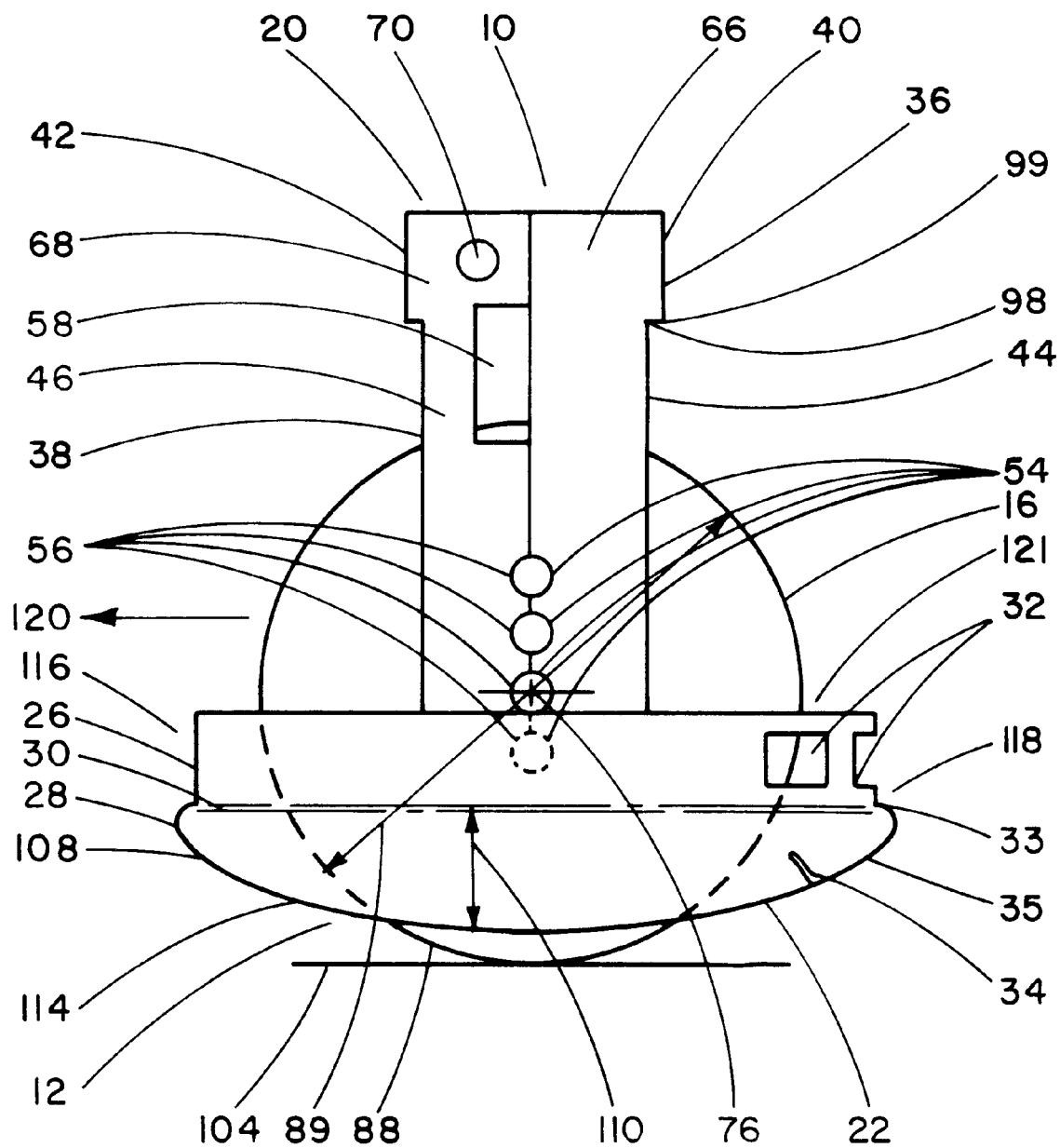
FIG. 7 is a side view of the skid with an alternate diameter wheel.
Figure 8:
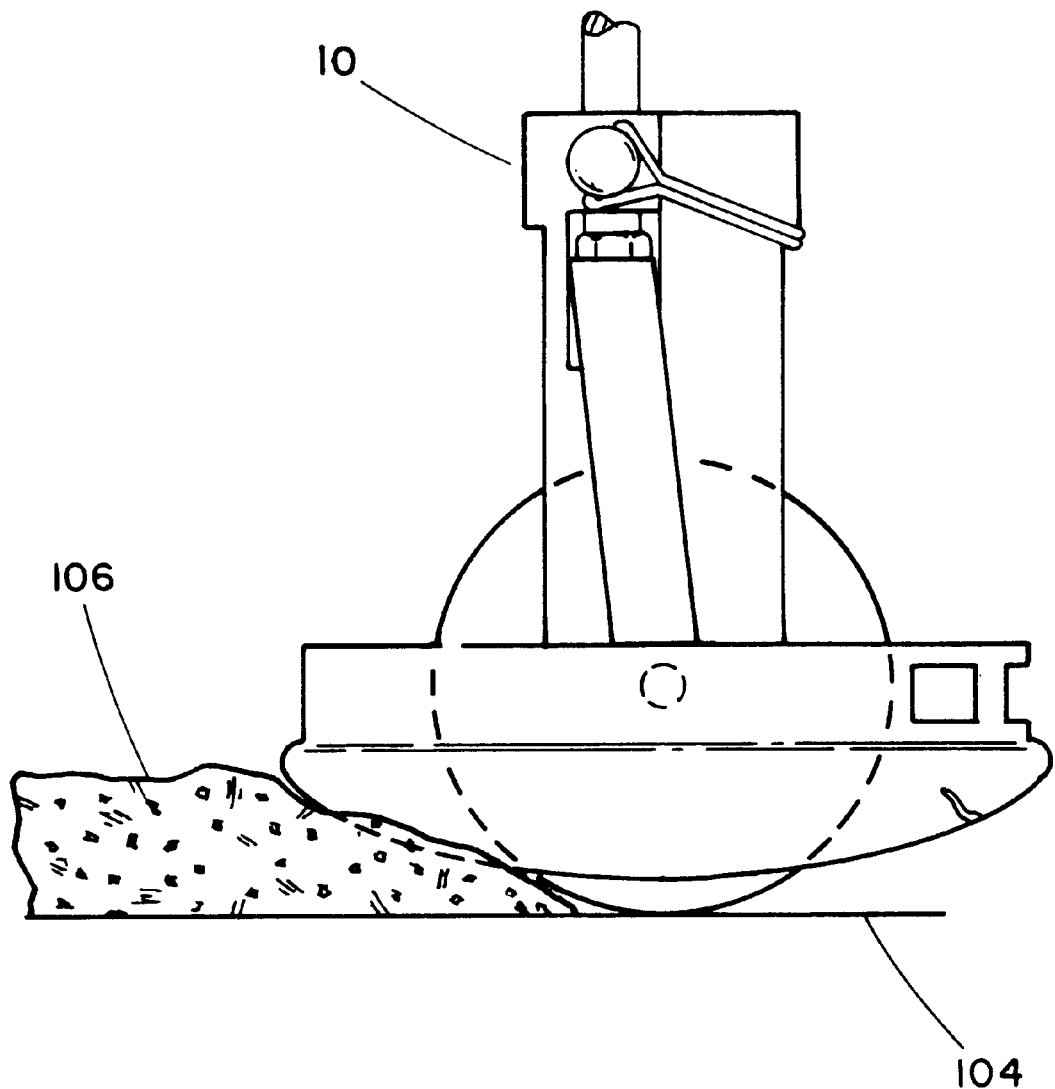
Figure 9:
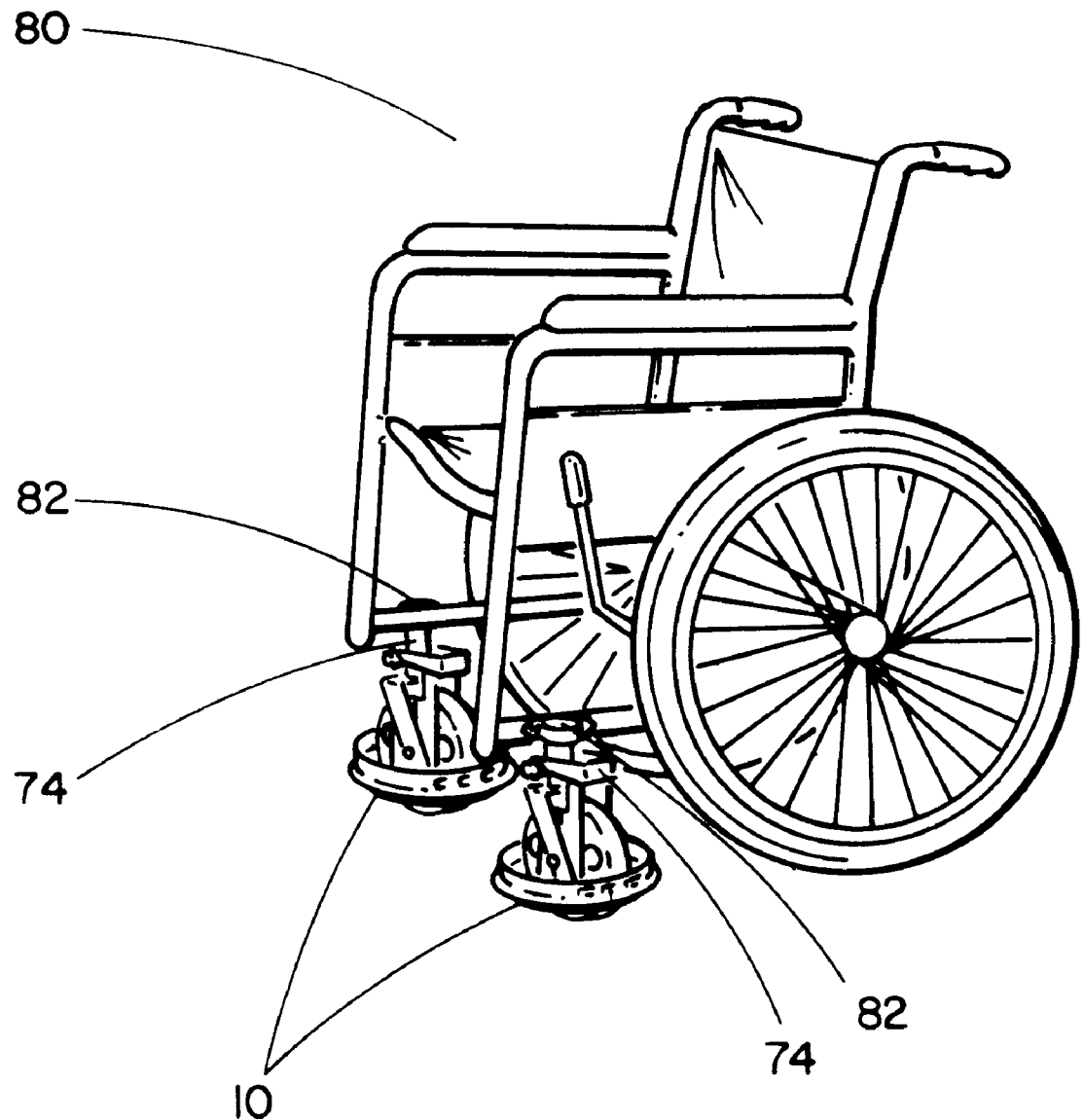
FIG. 9 is a perspective view of a wheel chair having the wheel skids affixed thereto.
Figure 10:
FIG. 10 is a perspective view of a stroller having the wheel skids affixed thereto.
Figure 11:
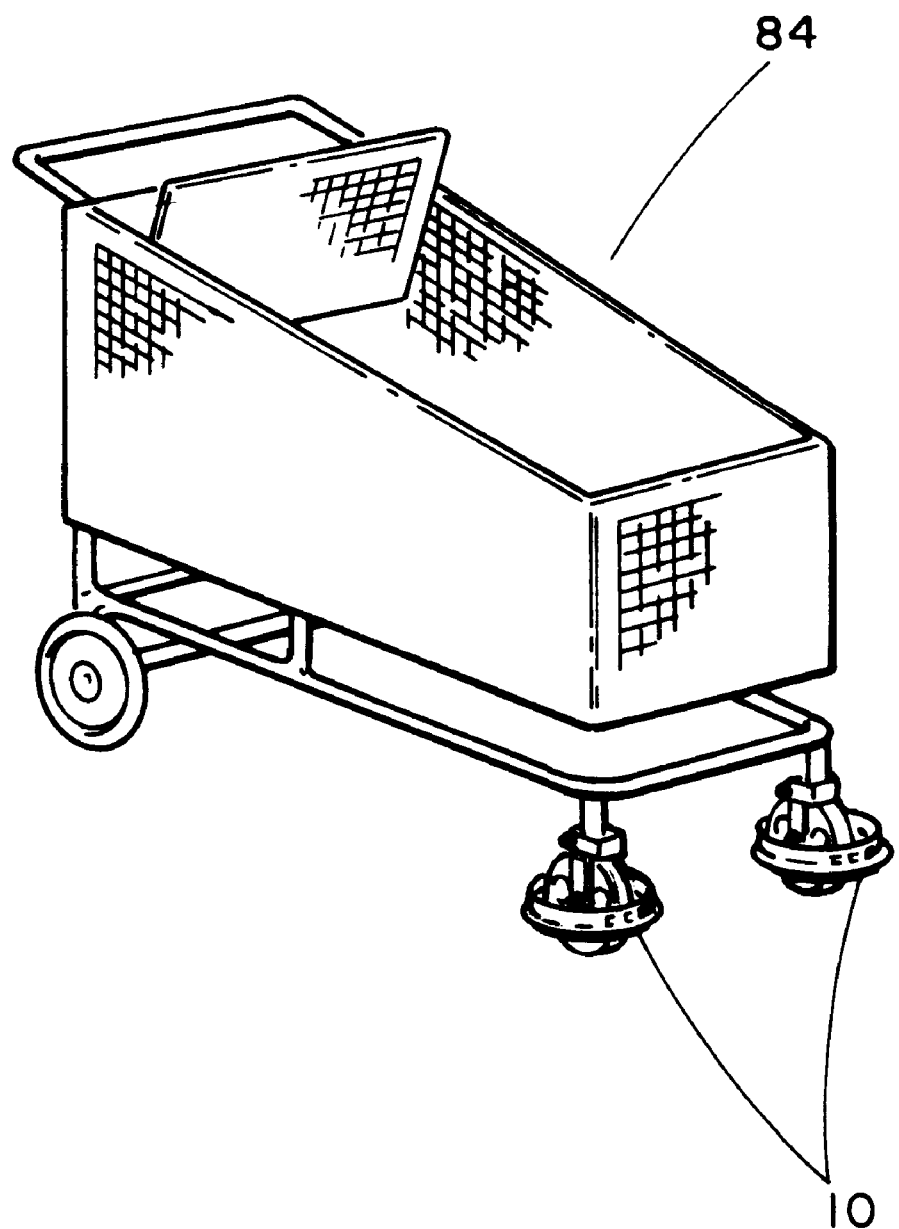
FIG. 11 is a perspective view of a shopping cart having the wheel skids of FIG. 1 affixed thereto.
Figure 12:
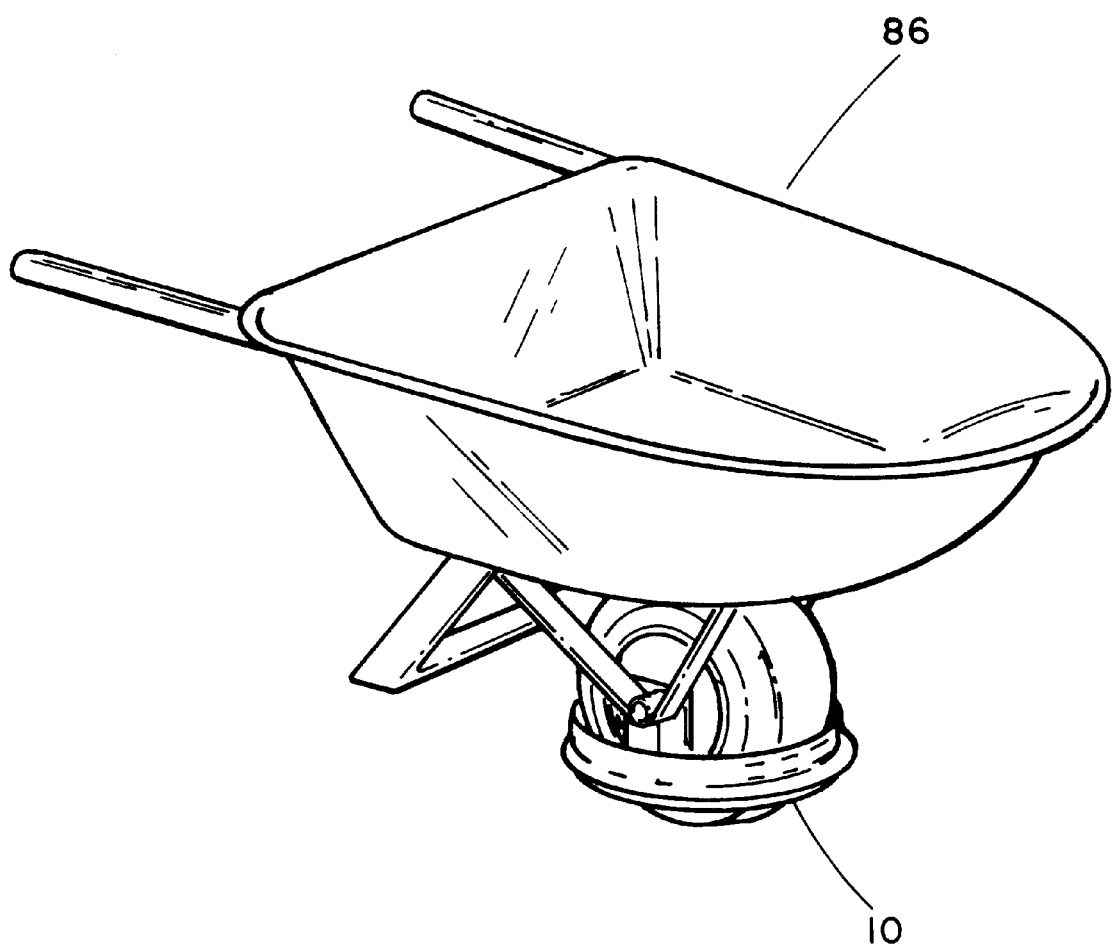
FIG. 12 is a perspective view of a wheel barrow having the wheel skids of FIG. 1 affixed thereto.
Figure 16:
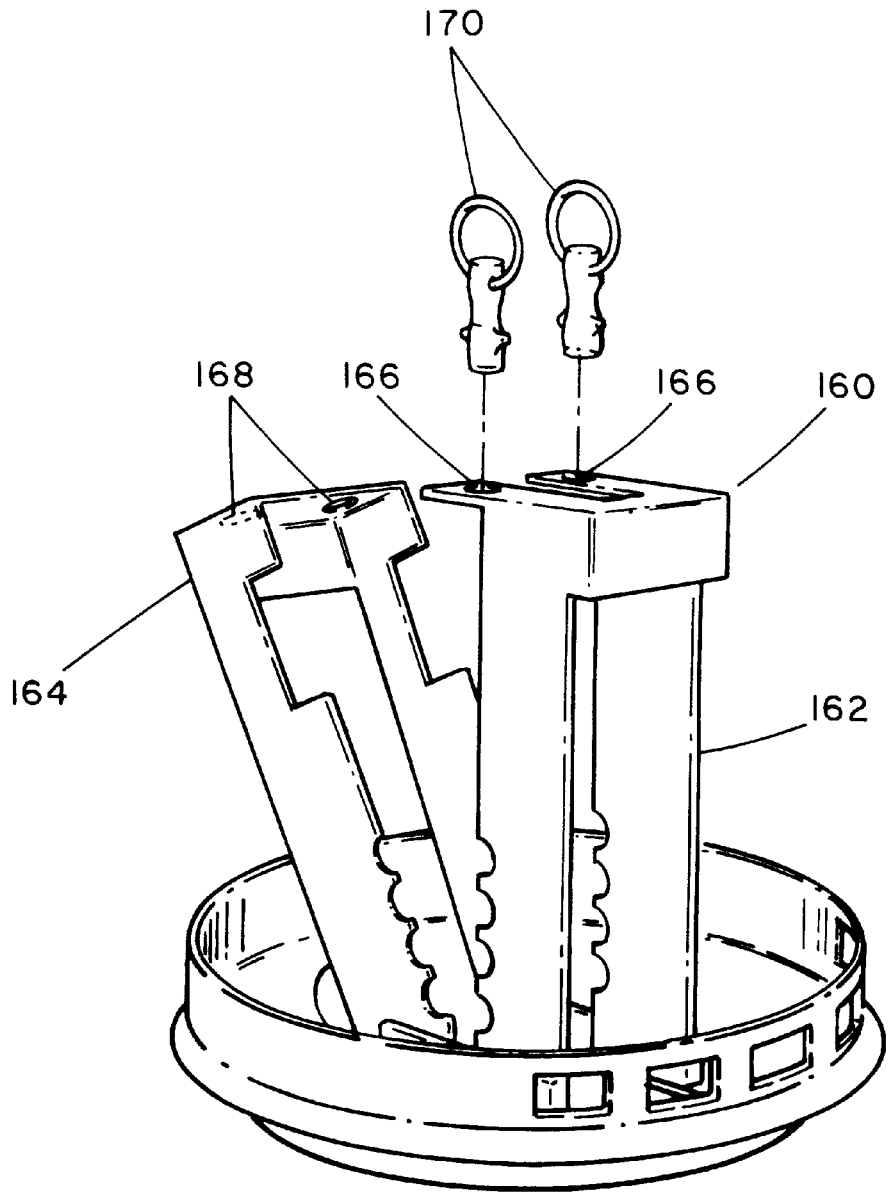
FIG. 16 is a perspective view of an alternate embodiment of a wheel skid constructed in accordance with the present invention.

An alternate embodiment of a skid 160 shown in FIG. 16 is substantially the same as the skid 122 of FIG. 2, except that the skid 160 has fixed cutout U shaped channel 162 and matingly hinged cutout U shaped channel 164 having holes 166 and 168, respectively, aligned upon closure. Locking pins 170 are inserted therethrough the holes 166 and 168 locking the fixed cutout U shaped channel 162 and matingly hinged cutout U shaped channel 164 one to the other.

Figure 17:
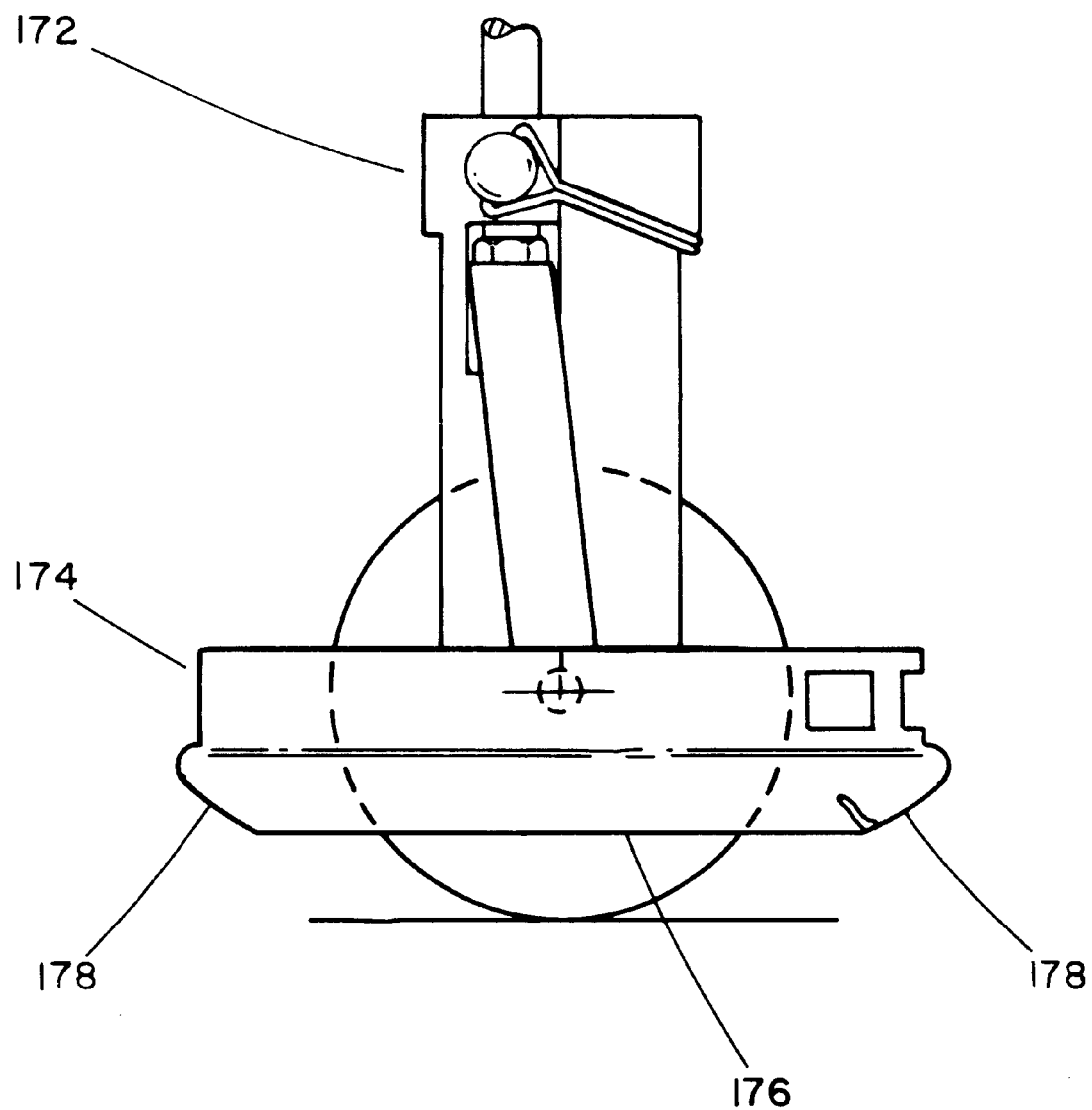
FIG. 17 is a side view of an alternate embodiment of a wheel skid constructed in accordance with the present invention.

An alternate embodiment of a wheel skid 172 shown in FIG. 17 is substantially the same as the wheel skid 10 of FIG. 1, except that the wheel skid 172 has base 174 having flat portion 176 and curved portion 178.

Figure 18:
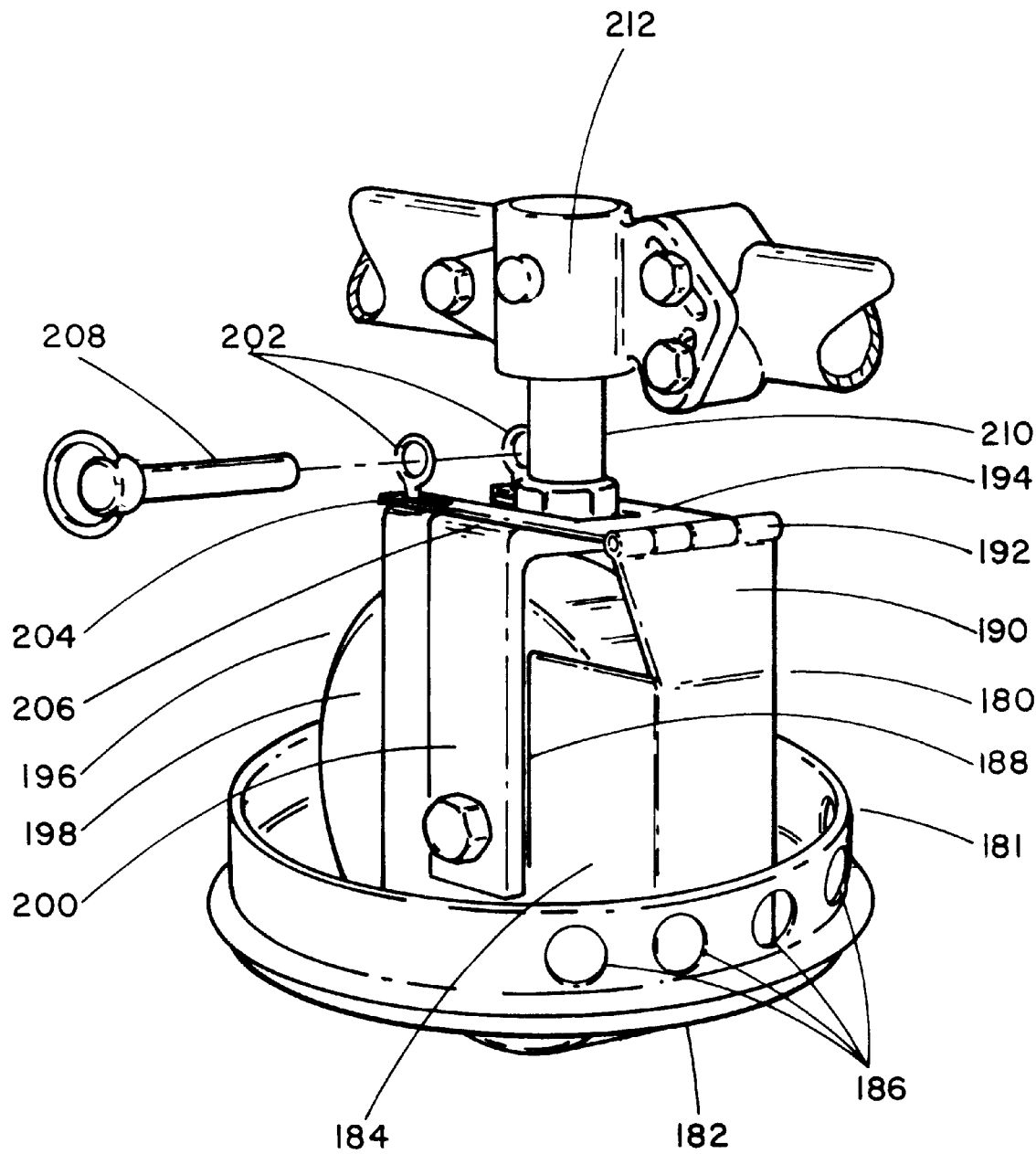
FIG. 18 is a perspective view of an alternate embodiment of a wheel skid constructed in accordance with the present invention.

An alternate embodiment of a wheel skid 180 is shown in FIG. 18. The wheel skid 180 has skid 181 having dish shaped base 182 and receiving housing 184. The dish shaped base 182 has round holes 186 and a slot (not shown). The dish shaped base 182 is adjoined to the receiving housing 184 having notch 188 and fixed hinge support member 190. The fixed hinge support member 190 has hinge 192 adjoined thereto and openable closure lid 194 adjoined thereto the hinge 192. Wheel assembly 196 having wheel 198 and fork 200 are inserted thereinto the receiving housing 184 with the wheel 198 therethrough the slot in the dish shaped base 182 and the fork 200 therein the receiving housing notch 188. The receiving housing 184 has eyes 202 adjoined to top 204 of the receiving housing 184. The hinged closure lid 194 having lid notches (not shown) is closed over top 206 of the fork 200 with the eyes 202 therethrough the lid notches. Pin 208 is inserted therethrough the eyes 202 to lock the wheel assembly therein the receiving housing 184. The wheel assembly has 196 has shaft 210 which may be adjoined to fitting 212 of a vehicle.

Although the present invention has been described in considerable detail with reference to certain preferred versions thereof, other versions are possible. Therefore, the spirit and scope of the appended claims should not be limited to the description of the preferred versions contained herein.

What is claimed is:

1. A wheel skid for a wheel assembly, comprising:
    a base having an elongated slot therein for allowing a wheel of said wheel assembly to extend therethrough;
    a channel affixed to said base, said channel for allowing said wheel of said wheel assembly to extend therethrough; and fastener means for fastening said wheel assembly thereto said wheel skid.

2. The wheel skid according to claim 1, wherein said fastener has a fixed U shaped channel and a hingedly mating U shaped channel.

3. The wheel skid according to claim 2, wherein said fixed U shaped channel is adjoined to said base.

4. The wheel skid according to claim 2, wherein said fixed U shaped channel and said hingedly mating U shaped channel have side members, respectively, said respective side members having respective mating semicircular holes, upon abuttingly closing said hingedly mating U shaped channel side members against said fixed U shaped channel side members.

5. The wheel skid according to claim 4, wherein said fixed U shaped channel and said hingedly mating U shaped channel respective side members have aligned holes each to the other, and a fastener therethrough said aligned holes of said abuttingly closed said hingedly mating U shaped channel side members against and therethrough said fixed U shaped channel side members.

6. The wheel skid according to claim 4, wherein one said abuttingly closed U shaped channel has side extension members having aligned holes and said other U shaped channel has sides having aligned holes, said side extension members aligned holes aligned with said other abuttingly closed U shaped channel sides holes, and a fastener therethrough said aligned holes of said abuttingly closed said side extension members and therethrough said other U shaped channel sides aligned holes.

7. The wheel skid according to claim 6, wherein said pin has a hinged spring loaded latch locking said abuttingly closed hingedly mating U shaped channel against said fixed U shaped channel.

8. The wheel skid according to claim 6, wherein said pin has a resilient strap locking said abuttingly closed hingedly mating U shaped channel against said fixed U shaped channel.

9. The wheel skid according to claim 4, wherein at least one said U shaped channel side members have notch portions.

10. The wheel skid according to claim 9, wherein said wheel assembly has a fork, an axle affixed to said fork, said wheel mounted on said axle, and a shaft mounted thereto said fork, said axle mounted therethrough selected said respective mating semicircular holes of said abuttingly closed said hingedly mating U shaped channel side members and therethrough said respective mating semicircular holes of said abutted fixed U shaped channel side members, and a portion of said fork therethrough said U shaped channel side members notch portions.

11. The wheel skid according to claim 4, wherein said wheel assembly has a fork, an axle affixed to said fork, said wheel mounted on said axle, and a shaft mounted thereto said fork, said axle mounted therethrough selected said respective mating semicircular holes of said abuttingly closed said hingedly mating U shaped channel side members and therethrough said respective mating semicircular holes of said abutted fixed U shaped channel side members, and said fork is exterior to said fixed U shaped channel and said hingedly mating U shaped channel.

12. The wheel skid according to claim 1, wherein said wheel assembly has a fork, an axle affixed to said fork, said wheel mounted on said axle, and a shaft mounted thereto said fork.

13. The wheel skid according to claim 12, wherein said fork is angularly offset from said shaft.

14. The wheel skid according to claim 12, wherein said fork is collinear with said shaft.

15. The wheel skid according to claim 12, wherein said shaft mounted on said fork is swivel mounted to allow free rotational motion of said fork with respect to said shaft.

16. The wheel skid according to claim 12, wherein further said shaft is mounted thereto a receiving socket of a vehicle, mounting said wheel skid to said vehicle.

17. The wheel skid according to claim 1, wherein said wheel skid is constructed of materials from the group consisting of metals, thermoplastics, thermosetting polymers, and rubber.

18. The wheel skid according to claim 1, wherein further at least one said wheel skid is affixed to a vehicle.

19. The wheel skid according to claim 18, wherein said vehicle is from the group consisting of wheel chairs, strollers, shopping carts, wheel barrows, motorized vehicles, and engine driven vehicles.

20. The wheel skid according to claim 1, wherein further said wheel skid has a fastener for fastening said wheel skid to a vehicle.

21. The wheel skid according to claim 1, wherein said base has a convex surface.

22. The wheel skid according to claim 1, wherein said base is bowl shaped.

23. The wheel skid according to claim 1, wherein said base is substantially triangular shaped.

24. The wheel skid according to claim 1, wherein said base has a flotation collar adjoined to said base.

25. The wheel skid according to claim 1, wherein said wheel skid has locking means for locking said hingedly mating U shaped channel against said fixed U shaped channel.

26. The wheel skid according to claim 1, wherein said base is substantially saucer shaped.

27. The wheel skid according to claim 1, wherein said base has a rim.

28. The wheel skid according to claim 27, wherein said rim has at least one hole.

29. The wheel skid according to claim 1, wherein said slot is substantially centrally located in said base.

30. The wheel skid according to claim 1, wherein said base has a lip adjacent said slot.

31. The wheel skid according to claim 1, wherein said fastener means has a pivotally hinged member having a portion of said pivotally hinged member abutting a portion of said channel, said channel and said hinged member adapted to be positioned about said wheel assembly with said wheel assembly protruding therethrough said slot.

32. The wheel skid according to claim 31, wherein further said fastener means has a removable fastener for fastening said hinged member to said channel.

33. The wheel skid according to claim 31, wherein said pivotally hinged member is a U-shaped channel.

34. The wheel skid according to claim 31, wherein said U-shaped channel has a cut out portion for allowing said wheel of said wheel assembly to protrude therethrough.

35. The wheel skid according to claim 31, wherein said pivotally hinged member has a cut out portion for allowing said wheel of said wheel assembly to protrude therethrough.

36. The wheel skid according to claim 1, wherein said channel is U-shaped.

37. The wheel skid according to claim 1, wherein said channel has a hollow portion therethrough.

38. The wheel skid according to claim 1, wherein said channel is tube shaped.

39. The wheel skid according to claim 1, wherein said base is substantially arcuate shaped.

40. The wheel skid according to claim 1, wherein said base is substantially dish shaped.

41. The wheel skid according to claim 1, wherein said base is a compound base having at least one shape.

42. The wheel skid according to claim 41, wherein said compound base has a substantially planar portion and a substantially curved portion.

43. The wheel skid according to claim 1, wherein said base is substantially circular.

44. The wheel skid according to claim 31, wherein said pivotally hinged member is hinged to said base.

45. The wheel skid according to claim 31, wherein said pivotally hinged member is hinged to said channel.

* * * * *